US009062772B2

(12) United States Patent
De Angelis et al.

(10) Patent No.: US 9,062,772 B2
(45) Date of Patent: Jun. 23, 2015

(54) STIR CHAMBERS FOR STIRRING MOLTEN GLASS AND HIGH-TEMPERATURE SEALING ARTICLES FOR THE SAME

(71) Applicants: Gilbert De Angelis, Lindley, NY (US); Kevin Scott Riegel, Owego, NY (US)

(72) Inventors: Gilbert De Angelis, Lindley, NY (US); Kevin Scott Riegel, Owego, NY (US)

(73) Assignee: Corning Incorporated, Corning, NY (US)

( * ) Notice: Subject to any disclaimer, the term of this patent is extended or adjusted under 35 U.S.C. 154(b) by 337 days.

(21) Appl. No.: 13/662,607

(22) Filed: Oct. 29, 2012

(65) Prior Publication Data

US 2014/0117017 A1    May 1, 2014

(51) Int. Cl.
| | |
|---|---|
| C03B 5/182 | (2006.01) |
| C03B 5/42 | (2006.01) |
| F16J 15/10 | (2006.01) |
| C03B 5/16 | (2006.01) |
| C03B 5/187 | (2006.01) |
| B01F 7/00 | (2006.01) |
| F16J 15/06 | (2006.01) |

(52) U.S. Cl.
CPC .................. *F16J 15/102* (2013.01); *C03B 5/16* (2013.01); *C03B 5/187* (2013.01); *C03B 5/42* (2013.01); *B01F 7/00633* (2013.01); *B01F 7/00908* (2013.01); *F16J 15/062* (2013.01); *F16J 15/104* (2013.01)

(58) Field of Classification Search
CPC ............ C03B 5/18; C03B 5/16; C03B 5/187; C03B 5/42; F16J 15/104; F16J 15/062; F16J 15/102
See application file for complete search history.

(56) References Cited

U.S. PATENT DOCUMENTS

| 2,667,804 | A | * | 2/1954 | Boyer et al. ........................ 87/1 |
|---|---|---|---|---|
| 4,576,081 | A | * | 3/1986 | Felthuis et al. ..................... 87/6 |
| 5,082,293 | A | * | 1/1992 | Steinetz et al. ............... 277/345 |
| 5,301,595 | A | * | 4/1994 | Kessie ................................. 87/6 |
| 6,039,325 | A | * | 3/2000 | Steinetz et al. ............... 277/633 |
| 7,497,443 | B1 | * | 3/2009 | Steinetz et al. ............... 277/644 |
| 8,650,910 | B2 | * | 2/2014 | Kim et al. ....................... 65/346 |
| 2006/0042318 | A1 | * | 3/2006 | Burdette et al. ............. 65/134.2 |
| 2009/0217708 | A1 | * | 9/2009 | DeAngelis et al. .......... 65/134.2 |
| 2010/0080078 | A1 | * | 4/2010 | Goller et al. .................. 366/145 |
| 2010/0126225 | A1 | * | 5/2010 | Ding et al. ................... 65/135.3 |
| 2011/0126592 | A1 | * | 6/2011 | De Angelis et al. ............. 65/90 |

* cited by examiner

*Primary Examiner* — Jason L Lazorcik
(74) *Attorney, Agent, or Firm* — Kevin M. Able (57) ABSTRACT

Stir chambers for stirring molten glass are disclosed. The stir chambers include a support frame, a sealing article, and a removable cover panel. The stir chambers also include a gland coupled to one of the support frame or the removable cover panel, and into which the sealing article is inserted. The stir chambers further include a seal land coupled to one of the support frame or the removable cover panel. The sealing article includes a plurality of ceramic filaments bundled together to form a core portion and a jacket portion that includes a plurality of ceramic filaments woven together. The removable cover panel is coupled to the support frame such that at least a portion of the seal land is positioned inside the gland to compress the sealing article.

20 Claims, 5 Drawing Sheets

I## STIR CHAMBERS FOR STIRRING MOLTEN GLASS AND HIGH-TEMPERATURE SEALING ARTICLES FOR THE SAME

BACKGROUND

1. Field

The present specification generally relates to static sealing interfaces for high temperature applications, and more specifically, to static sealing interfaces for stir chambers to reduce condensation-formed contaminants during glass formation.

2. Technical Background

Manufacturing operations that are performed at elevated temperature conditions are implemented across a variety of industries and applications. Some examples of such manufacturing operations include glass formation, ceramic formation, and alloy formation. Equipment used in such operations includes furnaces, kilns, incinerators, reactors, and/or other refractory equipment. To maintain the temperature and atmospheric conditions in the refractory equipment, seals may be incorporated into the refractory equipment where components are joined to one another.

Seals for high-temperature applications may reduce fluid flow between the joined components to prevent the ingress or egress of fluid to or from the refractory equipment. Such fluid flow may cause localized temperature variation inside the refractory equipment, which may lead to condensate formation inside the refractory equipment. Such condensate formation may foul the product being produced in the refractory equipment.

Further, components of the refractory equipment may be separable from one another to provide access to an end-user for servicing of internal components of the refractory equipment. Seals positioned between such separable components of the refractory equipment may be subject to frequent loading and unloading, as well as movement between components. Seals positioned in such locations may tend to exhibit wear and/or breakage caused by exercising the seal.

Accordingly, stir chambers for stirring molten glass that incorporate static sealing interfaces are needed.

SUMMARY

Disclosed herein are stir chambers for stirring molten glass comprising sealing interfaces for reducing air flow into or out of the stir chamber, as well as preventing contamination of the molten glass in the stir chambers. Also disclosed are resilient sealing articles for the same. Stir chambers having such sealing interfaces and sealing articles reduce formation of inclusions and defects in finished glass products produced from the molten glass stirred in the stir chamber.

According to various embodiments, a stir chamber for stirring molten glass includes a support frame and a removable cover panel selectively coupled to the support frame. The stir chamber also includes a gland coupled to one of the support frame or the removable cover panel, the gland having a back wall and two sidewalls extending from the back wall by a groove depth, where the two sidewalls are spaced apart from one another a groove width. The stir chamber further includes a seal land coupled to one of the support frame or the removable cover panel and positioned proximate to the gland, the seal land comprising a seal interface portion having a thickness less than the groove width of the gland. The stir chamber additionally includes a sealing article having a plurality of ceramic filaments bundled together to form a core portion and a jacket portion having a plurality of ceramic filaments woven together. The jacket portion surrounds the core portion. The seal interface portion is positioned inside the gland such that the sealing article is compressed and contacts the back wall of the gland. The seal interface portion is positioned a spacing distance away from the back wall, where the spacing distance is less than the groove depth.

According to further embodiments, a stir chamber for stirring molten glass includes at least one wall and a cover positioned proximate to the at least one wall, the at least one wall and the cover fabricated from refractory materials. The stir chamber also includes a shell portion at least partially surrounding the at least one wall, a support frame coupled to the shell portion, and a first removable cover panel and a second removable cover panel coupled to the support frame. The stir chamber further includes a plurality of glands coupled to at least one of the support frame or the first or second removable cover panels. Each of the glands has a back wall and two sidewalls extending from the back wall by a groove depth, where the two sidewalls are spaced apart from one another a groove width. The stir chamber additionally includes a plurality of seal lands coupled to at least one of the support frame or the first or second removable cover panels and positioned proximate to a gland. Each of the seal lands has a seal interface portion with a thickness less than the groove width of the gland. The stir chamber also includes a sealing article having a plurality of ceramic filaments bundled together to form a core portion and a jacket portion comprising a plurality of ceramic filaments woven together, where the jacket portion surrounds the core portion. The seal interface portions are positioned at least partially inside the gland such that the sealing article is compressed and contacts the back wall of the gland, and the seal interface portion is positioned a spacing distance away from the back wall, where the spacing distance is less than the groove depth.

According to yet further embodiments, a sealing article for a high-temperature, static-interface application includes a plurality of ceramic filaments bundled together to form a core portion, and a jacket portion surrounding the core portion to provide resiliency to the core portion. The jacket portion comprising a plurality of ceramic filaments woven together. The sealing article is free of metal and metallic components.

Additional features and advantages of the embodiments described herein will be set forth in the detailed description which follows, and in part will be readily apparent to those skilled in the art from that description or recognized by practicing the embodiments described herein, including the detailed description that follows, the claims, as well as the appended drawings.

It should be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
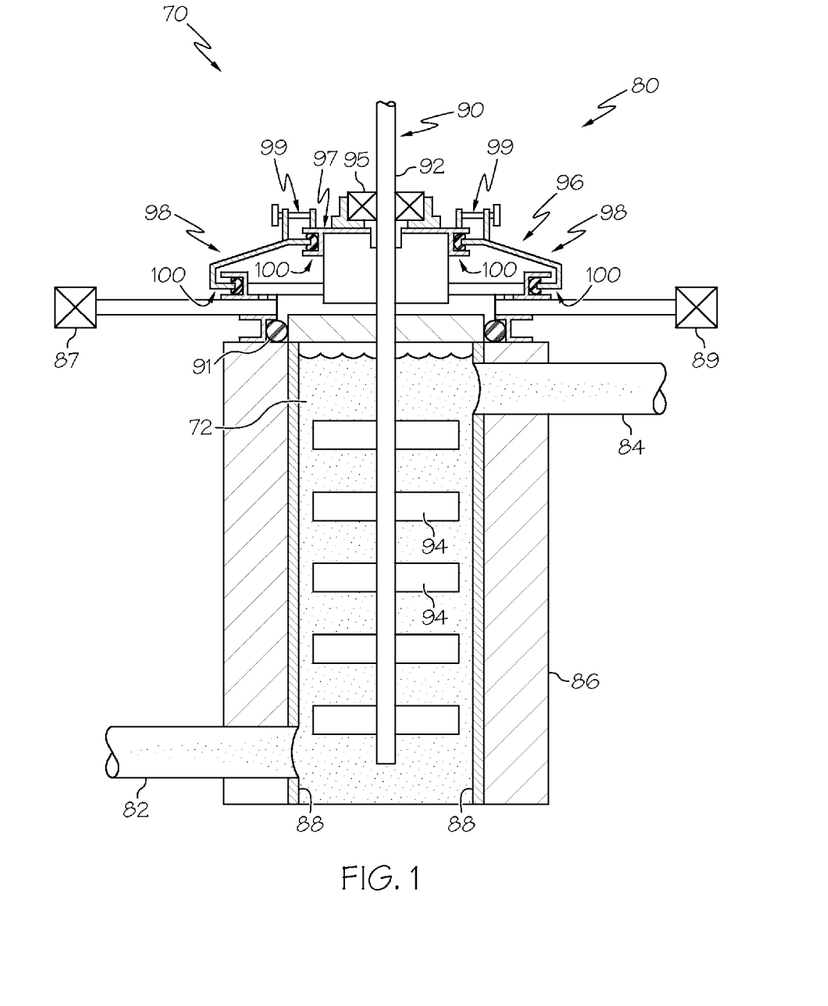
FIG. 1 schematically depicts a cross-sectional side view of a stir chamber having a static seal interface according to one or more embodiments shown or described herein.

Reference will now be made in detail to embodiments of static seal interfaces and stir chambers incorporating the same. Whenever possible, the same reference numerals will be used throughout the drawings to refer to the same or like parts. One example of a stir chamber incorporating a static seal interface is schematically depicted in FIG. 1. The static seal interface includes a gland coupled to one of the frame or the removable cover panel, and a seal land coupled to the opposite of the frame or the removable cover panel. The gland includes a back wall and two sidewalls extending from the back wall. A sealing article is provided, which includes a plurality of ceramic filaments bundled together to form a core portion. The sealing article also includes a jacket portion that surrounds the core portion and includes a plurality of ceramic filaments woven together. The sealing article may be free of metallic components. The seal land is positioned inside the gland and contacts and compresses the sealing article to form a seal between the frame and the removable cover panel. Static seal interfaces and stir chambers incorporating static seal interfaces will be described in more detail herein with specific reference to the appended drawings.

FIG. 1 schematically depicts a stir chamber 80, which is refractory equipment 70 that may be used in a glass manufacturing process to homogenize a glass melt. The stir chamber 80 includes a first transfer pipe 84 and a second transfer pipe 82. In the illustrated embodiment, molten glass 72 flows into the stir chamber 80 through the first transfer pipe 84 into the stir chamber 80, and through the second transfer pipe 82. In some configurations, molten glass 72 may flow into the stir chamber 80 through the second transfer pipe 82 and exit through the first transfer pipe 84. The stir chamber 80 further includes at least one wall 86. In the depicted embodiment, the at least one wall 86 is cylindrically-shaped and extends in a generally vertical orientation. The stir chamber 80 may include an inner liner 88 that is made from a material that is stable at elevated temperatures, such as, platinum or a platinum alloy such as a platinum-rhodium alloy or a platinum-iridium alloy.

The stir chamber 80 also includes a stirrer 90 that includes a shaft 92 and a plurality of blades 94 extending outwards from the shaft 92 towards the at least one wall 86 of the stir chamber 80. The shaft 92 of the stirrer 90 may be supported by a bearing 95, which allows the stirrer 90 to rotate within the stir chamber 80. The bearing 95 may be a sealed bearing that limit the flow of fluids into or out of the stir chamber 80. Alternatively, or in addition, an auxiliary shaft seal (not shown) may be positioned proximate to the shaft 92 and the bearing 95 to limit the flow of fluids into or out of the stir chamber 80. The stirrer 90 rotates within the stir chamber 80 and induces mixing of the molten glass 72 as the molten glass 72 remains in the stir chamber 80. The shaft 92 and the blades 94 of the stirrer 90 may be made from a variety of materials that are stable at elevated temperatures, for example, platinum, a platinum alloy, rhodium, a rhodium alloy, iridium, an iridium alloy, or a dispersion-strengthened metal or alloy (e.g., a zirconia-strengthened platinum alloy).

The stir chamber 80 also includes a chamber lid 96. As depicted in FIG. 1, the chamber lid 96 may be positioned along the top surface of the at least one wall 86. The chamber lid 96 may include a support frame 97 and at least one removable cover panel 98. In some embodiments the support frame 97 may be permanently or semi-permanently coupled to the at least one wall 86 such that a seal member 91 may be positioned between the support frame 97 and the at least one wall 86. The seal member 91 may made from a plurality of ceramic filaments bundled together. In one embodiment, the seal member 91 may be a rope seal. Because the support frame 97 is permanently or semi-permanently coupled to the at least one wall 86, the seal member 91 is generally not subjected to abrasion and wear during normal operation and maintenance of the stir chamber 80. The support frame 97 and the at least one removable cover panel 98 may include a tension member 99 that secures the at least one removable cover panel 98 in position relative to the support frame 97.

Figure 2:
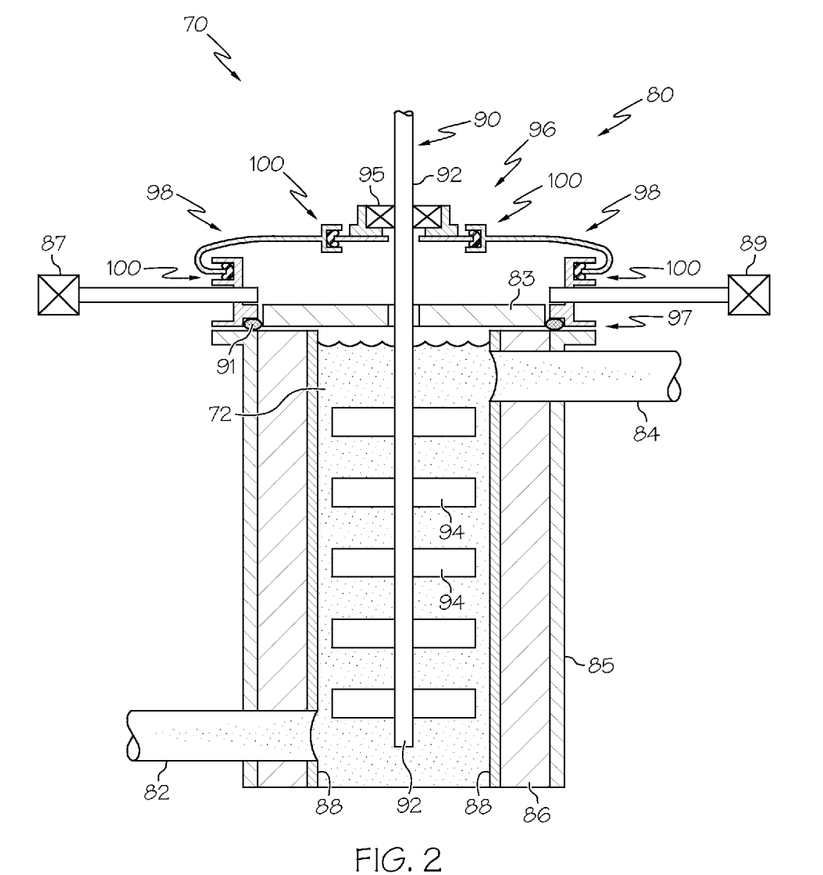
FIG. 2 schematically depicts a cross-sectional side view of a stir chamber having a static seal interface according to one or more embodiments shown or described herein.
Figure 3:
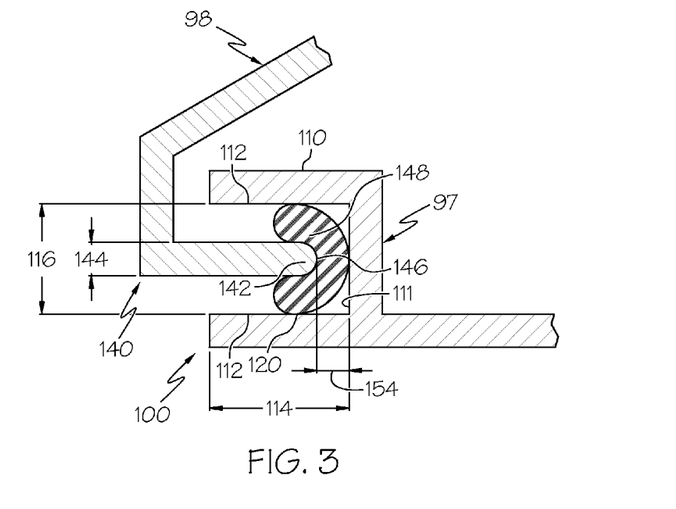
FIG. 3 schematically depicts a partial cross-sectional side view of a static seal interface according to one or more embodiments shown or described herein.

The stir chamber 80 further includes a static seal interface 100 between the support frame 97 and the removable cover panel 98, which is shown in greater detail in FIG. 3. The static seal interface 100 includes a gland 110 coupled to a portion of the stir chamber 80, a seal interface portion 142 coupled to a portion of the stir chamber 80, and a sealing article 120 positioned between the gland 110 and the seal interface portion 142, thereby forming a seal between the removable cover panel 98 and the support frame 97 of the stir chamber 80. As depicted in FIG. 1, the gland 110 is coupled to the support frame 97 and the seal interface portion 142 is coupled to the removable cover panel 98. The relative positioning of the gland 110 and the seal interface portion 142 relative to the removable cover panel 98 and the support frame 97 may vary. For example, the embodiment of the stir chamber 80 depicted in FIG. 2, the gland 110 is coupled to the removable cover panel 98 while the seal interface portion 142 is coupled to the support frame 97. While specific mention is made herein to the relative positioning of the gland 110 and the seal interface portion 142 relative to the support frame 97 and the removable cover panel 98, respectively, it should be understood that the gland 110 and the seal interface portion 142 may vary in position without departing from the scope of the present disclosure.

Referring to FIG. 2, the depicted embodiment of the stir chamber 80 is similar to the embodiment depicted in FIG. 1, and includes a cover 83 positioned proximate to the at least one wall 86. In embodiments of the stir chamber 80, the at least one wall 86 and the cover 83 may be fabricated from a refractory material that is stable at elevated temperatures. In some embodiments, the at least one wall 86 and the cover 83 may be made from a ceramic material. The stir chamber 80 also includes a shell portion 85 that at least partially surrounds the at least one wall 86. In the embodiment depicted in FIG. 2, the support frame 97 is coupled to the shell portion 85. A seal member 91 is positioned between the support frame 97 and the shell portion 85 such that the seal member 91 inhibits fluid flow between the support frame 97 and the shell portion 85 into the molten glass 72 located within the stir chamber 80. In embodiments of the stir chamber 80, the support frame 97 may be permanently or semi-permanently attached to the shell portion 85, such that removal of the support frame 97 from the shell portion 85 occurs infrequently. As such, the seal member 91 is infrequently disturbed due to assembly and disassembly of the support frame 97 to or from the shell portion 85.

Figure 4:
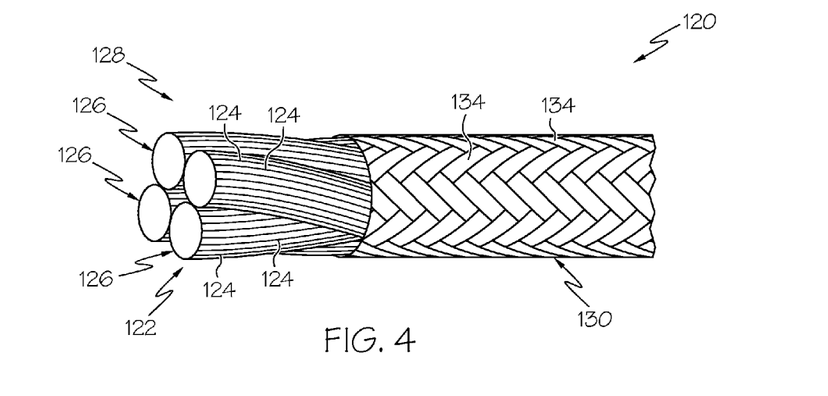
FIG. 4 schematically depicts a partial perspective side view of a sealing article for a high-temperature static-interface application according to one or more embodiments shown or described herein.

Compression of the sealing article 120 between the gland 110 and the sealing interface 142 provides the seal between the removable cover panel 98 and the support frame 97, as depicted in FIGS. 1-3, such that the removable cover panel 98 can be removed from and reattached to the support frame 97. Referring now to FIG. 4, a portion of the sealing article 120 depicted in FIGS. 1-3 is shown in greater detail in an uncompressed state. The sealing article 120 includes a core portion 122 and a jacket portion 130 that surrounds the core portion 122. The jacket portion 130 may extend continuously along the length of the core portion 122. The core portion 122 includes a plurality of ceramic filaments 124 bundled together. In the embodiment of the sealing article 120 depicted in FIG. 2, the ceramic filaments 124 are bundled into threads 126 that are twisted about one another to form a rope 128. The ceramic filaments 124 may be made from a variety of materials that are suitable for high temperature applications. Examples of such materials include, for example and without limitation, aluminosilicate fibers. In one embodiment, the ceramic filaments 124 may be Fiberfrax® refractory ceramic fiber forms available from Unifrax of Niagara Falls, N.Y.

The jacket portion 130 of the sealing article 120 may include a plurality of ceramic filaments 134 woven together. In one embodiment, the ceramic filaments 134 may be braided in a regular, intertwined relationship such that the ceramic filaments 134 overly one another and form a covering that has a generally uniform thickness. The ceramic filaments 134 of the jacket portion 130 may be made from a variety of materials suitable for high temperature applications. Examples of such materials include, for example and without limitation, aluminum oxide fibers, silicon dioxide fibers, and/or boron trioxide fibers. In one embodiment, the ceramic filaments 134 may be braided Nextel™ 440 or Nextel™ 312 available from 3M of St. Paul, Minn. The jacket portion 130 of the sealing article 120 may provide additional abrasion resistance to the sealing article 120 and mitigates damage to the ceramic filaments 124 of the core portion 122. The jacket portion 130 also increases the resiliency of the sealing article 120 for end-user applications. Sealing articles 120 having core portions 122 and jacket portions 130, as described hereinabove, may be free from any metallic components in the sealing articles 120. Instead, the sealing articles 120 may incorporate ceramic materials that can withstand the operational specifications of a non-permanent static seal interface 100.

Referring again to FIG. 3, the static seal interface 100 includes the gland 110 that positions the sealing article 120 for contact with the sealing interface 142. The gland 110 includes a back wall 111 and two sidewalls 112 that extend from the back wall 111 a groove depth 114. The sidewalls 112 are spaced apart from one another a groove width 116. The static seal interface 100 also includes a seal land 140 that is positioned proximate to the gland 110 of the static seal interface 100. The seal land 140 includes a seal interface portion 142 that has a thickness 144 that is less than the groove width 116. As depicted in FIG. 3, the seal interface portion 142 may include a contoured portion 146 that contacts the sealing article 120.

When the removable cover panel 98 is positioned relative to the support frame 97 to enclose the stir chamber 80, the seal interface portion 142 of the seal land 140 is positioned between the sidewalls 112 of the gland 110. The seal interface portion 142 is positioned relative to the back wall 111 of the gland 110 such that the seal interface portion 142 is positioned a spacing distance 154 away from the back wall 111. The spacing distance 154 is less than the groove depth 114 of the gland 110.

Still referring to FIG. 3, the sealing article 120 is positioned inside the gland 110 such that the sealing article 120 is compressed by the seal interface portion 142 of the seal land 140. The sealing article 120 is held in position in the gland 110 by the seal interface portion 142 such that the sealing article 120 contacts at least the back wall 111 of the gland 110. In the embodiment depicted in FIG. 3, the sealing article 120 contacts both sidewalls 112 in addition to the back wall 111 when the removable cover panel 98 is positioned relative to the support frame 97 such that at least a portion of the seal land 140 is positioned in the gland 110. Further, in the embodiment depicted in FIG. 3, the sealing article 120 includes a concave portion 148 at positions where the seal interface portion 142 of the seal land 140 contacts the sealing article 120. The contact between the sealing article 120 and the gland 110 and the seal land 140 limits the flow of fluid across the static seal interface 100.

While specific mention has been made hereinabove to the gland 110 being positioned relative to the support frame 97 and the seal land 140 being positioned relative to the removable cover panel 98, it should be understood that static seal interfaces 100 and stir chambers 80 may have alternative configurations without departing from the scope of the present disclosure, such as a configuration in which the seal land 140 is coupled directly to the support frame 97 and the gland 110 is coupled directly to the removable cover panels 98.

Figure 5:
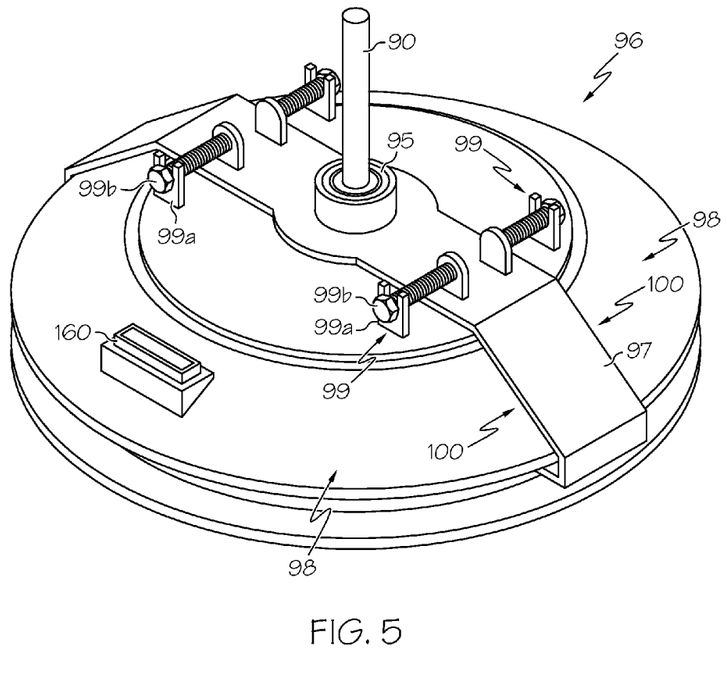
FIG. 5 schematically depicts a perspective side view of a support frame and a removable cover for a stir chamber according to one or more embodiments shown or described herein.

Referring now to FIG. 5, stir chambers 80 according to the present disclosure may include a plurality of removable cover panels 98 that are coupled to the support frame 97, such that a user can selectively remove the removable cover panel 98 to service components of the stir chamber 80. The stir chambers 80 according to the present disclosure may include at least one tension member 99 that releasably couples the removable cover panel 98 to the support frame 97. The tension member 99 may include a yoke 99a coupled to one of the removable cover panel 98 or the support frame 97 and a drawbolt 99b coupled opposite the yoke 99a to one of the removable cover panel 98 or the support frame 97. The tension member 99 allows a user to adjust the position of the removable cover panel 98 relative the support frame 97, such that the spacing distance 154 between the seal interface portion 142 and the back wall 111 is managed and the deformation of the sealing article 120 is controlled (see FIG. 3). At least one of the removable cover panels 98 may also include a viewing window 160 that allows an operator to inspect certain components of the stir chamber 80.

Referring again to FIGS. 1 and 2, stir chambers 80 according to the present disclosure may be used in processes to homogenize a glass melt at an elevated temperature (for example, from about 1400° C. to about 1600° C.) in either a pressurized environment (for example, by purging the stir chamber 80 with a gas introduced by a compressor system 87) or in a vacuum environment (for example, by evacuating gas from the stir chamber 80 using a vacuum system 89). The homogenization process may minimize the variation in chemically dissimilar phases of the molten glass 72. Such variations in chemical phases may result from a variety of normal occurrences during the melting process of the molten glass 72 including refractory dissolution, melting stratification, glass surface volatilization, and temperature differences.

Without being bound by theory, it is believed that volatile oxides in the stir chamber 80 may be formed from any of the elements present in the glass and stir chamber 80. Examples of such oxides are formed from platinum, arsenic, antimony, boron, and tin. Primary sources of condensable oxides in a glass melt include hot platinum surfaces for $PtO_2$, and the glass free surface for $B_2O_3$, $As_4O_6$, $Sb_4O_6$, and $SnO_2$. As used herein, the phrase "glass free surface" refers to the surface of the glass that is exposed to the atmosphere within the stir chamber 80. Because the atmosphere above the glass free surface, which atmosphere may contain any or all of the foregoing, or other volatile materials, is hotter than the atmosphere outside of the stir chamber 80, there is a tendency for the atmosphere above the glass free surface to flow upwards through any opening, such as through a gap between the support frame 97 and the removable cover panel 98. Temperatures of components of the stir chamber 80 generally decrease with increasing distance from the glass free surface and, as such, the volatile oxides contained within the stir chamber atmosphere may condense onto one or more of the surfaces of the shaft 92 of the stirrer 90, the at least one wall 86, the support frame 97, and/or the removable cover panel 98 at positions above the glass free surface. As the temperature of the stir chamber atmosphere falls below the dew point of the oxides, volatile oxides may condense to form condensate. Dew points for common volatile oxides may range from about 559° C. for $As_4O_6$ to about 1455° C. for $PtO_2$. When the resulting condensates reach a critical size, the condensates may break off of the internal surfaces of the stir chamber 80, falling into the molten glass 72 present in the stir chamber 80. Condensates that fall into the molten glass 72 may cause inclusions or other defects in the finished glass product.

Further, for non-permanent sealed joints including, for example, the static seal interface 100 described hereinabove, relative movement between components contacting the sealing article 120 may tend to abrade the seal positioned between the components. The relative movement may be caused by expansion of components caused by temperature variation. The relative movement may also be caused by assembly and disassembly of the components in the course of operation and/or maintenance. For sealing articles that do not exhibit high resiliency (i.e., a rope seal made from a plurality of ceramic filaments without a protective jacket), the relative movement may lead to damage to the sealing article. Such damage may cause portions of the ceramic filaments to break free of surrounding portions of the ceramic filaments and form seal debris. The seal debris may be introduced to the molten glass 72 present in the stir chamber 80. Seal debris that falls into the molten glass 72 may cause inclusions or other defects in the finished glass products.

Inclusions and defects in the finished glass products caused by one or more of the condensates or seal debris may negatively impact the yield of finish glass products produced from the molten glass 72. Finished glass products having such inclusions and defects may exhibit reduced strength and stability as compared to finished glass products made from glass without inclusions and defects. Moreover, inclusions and defects in the finished glass product may be rejected or cause spontaneous failure of the finished glass product. As such, reduction in the inclusions and defects caused by the condensates and seal debris is desirable for commercial applications.

Minimizing the flow of gases into and out of the atmosphere in the stir chamber reduces the amount of condensate formed in the stir chamber. Further, seals used in conjunction with the stir chamber that are resilient and resistant to damage caused by routine maintenance of the stir chamber may reduce generation of seal debris that may be introduced to the molten glass 72. As such, sealing articles 120 used in conjunction with stir chambers 80 according to the present disclosure reduces the formation of inclusions and defects in the finished glass products produced from molten glass 72 mixed in the stir chambers 80.

Figure 6:
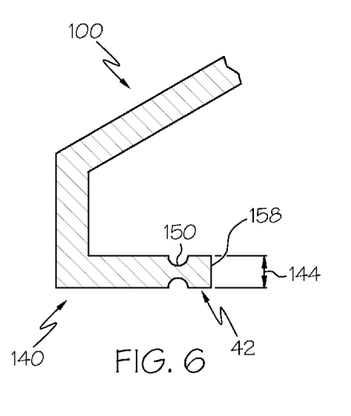
FIG. 6 schematically depicts a partial cross-sectional side view of a static seal interface according to one or more embodiments shown or described herein.

Referring to FIGS. 6-9, embodiments of seal lands 140 forming the static seal interface 100 of FIGS. 1-3 are depicted. Referring now to FIG. 6, a generic embodiment of the seal land 140 is depicted in detail. In this embodiment, the seal interface portion 42 of the seal land 140 includes a proximal face 158 that extends in a generally perpendicular orientation along the entire thickness 144 of the seal interface portion 42. Therefore, the seal interface portion 42 depicted in FIG. 6 has the minimum contact area of the proximal face 158 that will contact the sealing article 120 (see FIG. 3). The seal interface portion 42 exhibits the minimum dimensional area for the thickness 144 of the seal interface portion 42. As used herein, the phrase "dimensional area" refers to the minimum surface area of the seal interface portion calculated as the perimeter of the seal interface portion multiplied by the thickness 144 of the seal interface portion.

Still referring to FIG. 6, the seal interface 42 of the seal land 140 includes a seam portion 150 positioned distally from the seal interface portion 142. The seam portion 150 may be "necked" (i.e., having a smaller thickness than the thickness 144 of the seal interface portion 42, which is depicted in FIG. 6) or it may be "bulged" (i.e., having a larger thickness than the thickness 144 of the seal interface portion 42, which is not depicted). Dimensional accuracy of the seal interface portion 42 may be increased if manufactured into the seal land 140 at a later operation in the manufacturing process. In some embodiments, the seal interface portion 42 may be machined onto the seal land 140 in a machining operation. In other embodiments, the seal interface portion 42 may be attached to the seal land 140 in an attachment operation, for example a welding operation. A seam portion 150 along the seal land 140 may indicate that the seal interface portion 42 was incorporated into the seal land 140 in a separate manufacturing operation.

Figure 7:
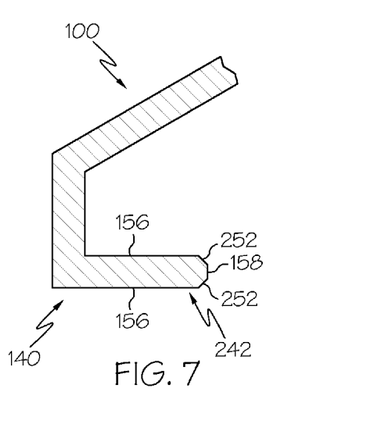
FIG. 7 schematically depicts a partial cross-sectional side view of a static seal interface according to one or more embodiments shown or described herein.
Figure 8:
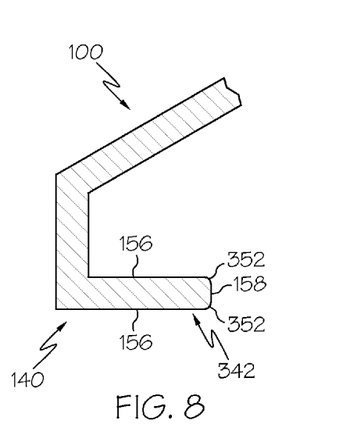
FIG. 8 schematically depicts a partial cross-sectional side view of a static seal interface according to one or more embodiments shown or described herein.

Referring now to FIGS. 7 and 8, embodiments of the seal interface portions 242, 342 are depicted. The seal interface portion 242 depicted in FIG. 5 includes upper and lower chamfers 252 that transition the seal interface portion 242 between a proximal face 158 and extension portion 156. The seal interface portion 342 depicted in FIG. 8 includes upper and lower rounds 352 that transition the seal interface portion 342 between the proximal face 158 and extension portions 156. Both of the seal interface portions 242, 342 depicted in FIGS. 7 and 8, respectively, exhibit increased surface area evaluated over the chamfers 252 and the proximal face 158 between the extension portions 156 or over the rounds 352 and the proximal face 158 between the extension portions 156 than a seal interface portion without transition features (i.e., the seal interface portion 42 depicted in FIG. 6). An increase in surface area of the seal interface portion (as represented by seal interface portions 242, 342 of FIGS. 7 and 8 as compared to the dimensional area of the seal interface portion 42 of FIG.

6) may increase the area that the seal land is in contact with the sealing article 120, thereby increasing the likelihood of formation of a low-flow seal. An increase in surface area of the seal interface portion 242, 342 may also locally decrease the pressure applied to the sealing article 120 by the seal interface portion 242, 342 when the removable cover panel 98 is secured to the support frame 97 to enclose the stir chamber 80 (see FIG. 1). Reduction in pressure on the sealing article 120 may increase decrease abrasion on the sealing article 120 and therefore may increase life of the sealing article 120.

Figure 9:
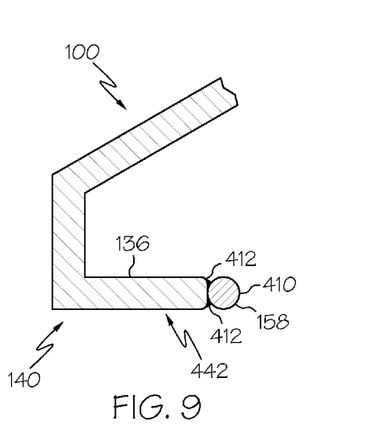
FIG. 9 schematically depicts a partial cross-sectional side view of a static seal interface according to one or more embodiments shown or described herein.

Referring now to FIG. 9, another embodiment of the seal interface portion 442 is depicted having an attached contact portion 410. The attached contact portion 410 may be secured to a stand-off 136, thereby forming the seal interface portion 442. The attached contact portion 410 may be permanently or semi-permanently attached to the stand-off 136 such that the contact portion 410 is resilient as to resist forces applied to the seal interface portion 442 and the contact portion 410 in particular. Incorporating the attached contact portion 410 into the seal interface portion 442 may allow for control of the shape and dimensions of the seal interface portion 442 independently of other components of the support frame 97 or the removable cover panel 98 (depicted in FIGS. 1-3).

In some embodiments, the attached contact portion 410 may be secured to the stand-off 136 through a welding, soldering, or brazing operation. In such an operation, filler material 412 may be present between the stand-off 136 and the attached contact portion 410. In some embodiments, the attached contact portion 410 may be removed from the stand-off 136 by melting the filler material 412, such that the attached contact portion 410 separates from the stand-off 136. In other embodiments, the attached contact portion 410 may be removed through a machining operation such as milling, turning, or grinding. Removal of the attached contact portion 410 allows for replacement of the attached contact portion 410 should the attached contact portion 410 become damaged.

It should be understood that static seal interfaces and stir chamber 80 incorporating said static seal interfaces according to the present disclosure include resilient sealing articles that are suitable for high-temperature end-user applications. The sealing articles include a plurality of ceramic filaments that are surrounded by a jacket portion that includes a plurality of ceramic filaments that are wound together to form a protective sheath. The sealing articles may be positioned in a static seal interface that includes a gland and a seal land that is at least partially positioned inside of the gland. A portion of the seal land contacts the sealing article to form a seal to prevent fluid flow across the static seal interface. The sealing article prevents defect formation in molten glass in the stir chamber 80 by minimizing condensate formation and seal debris generation.

In a first aspect, the disclosure provides a stir chamber 80 for stirring molten glass 72 comprising: a support frame 97; a removable cover panel 98 selectively coupled to the support frame 97, a gland 110 coupled to one of the support frame 97 or the removable cover panel 98, the gland 110 having a back wall 111 and two sidewalls 112 extending from the back wall 111 by a groove depth 114, wherein the two sidewalls 112 are spaced apart from one another a groove width 116; a seal land 140 comprising a seal interface portion 142 having a thickness 144 less than the groove width 116 of the gland 110; a sealing article 120 comprising a plurality of ceramic filaments 124 bundled together to form a core portion 122 and a jacket portion 130 comprising a plurality of ceramic filaments 124 woven together, wherein the jacket portion 130 surrounds the core portion 122, wherein the seal interface portion 142 is positioned inside the gland 110 such that the sealing article 120 is compressed and contacts the back wall 111 of the gland 110, and the seal interface portion 142 is positioned a spacing distance 154 away from the back wall 111, wherein the spacing distance 154 is less than the groove depth 114.

In a second aspect, the disclosure provides a stir chamber 80 for stirring molten glass 72 comprising: at least one wall 86 and a cover 83 positioned proximate to the at least one wall 86, the at least one wall 86 and the cover 83 comprising refractory materials; a shell portion 85 at least partially surrounding the at least one wall 86; a support frame 97 coupled to the shell portion 85, the support frame 97 comprising a gland 110 having a back wall 111 and two sidewalls 112 extending from the back wall 111 by a groove depth 114, wherein the two sidewalls 112 are spaced apart from one another a groove width 116; a sealing article 120 comprising a plurality of ceramic filaments 124 bundled together to form a core portion 122 and a jacket portion 130 comprising a plurality of ceramic filaments 124 woven together, wherein the jacket portion 130 surrounds the core portion 122; and a first removable cover panel 98 and a second removable cover panel 98 coupled to the support frame 97, the removable cover panels 98 each comprising a seal land 140 having a seal interface portion 142 with a thickness 144 less than the groove width 116 of the gland 110, wherein the seal interface portions 242 are positioned inside the gland 110 such that the sealing article 120 is compressed and contacts the back wall 111 of the gland 110, and the seal interface portion 142 is positioned a spacing distance 154 away from the back wall 111, the spacing distance 154 being less than the groove depth 114.

In a third aspect, the disclosure provides a sealing article 120 for a high-temperature, static-interface application, the sealing article 120 comprising: a plurality of ceramic filaments 124 bundled together to form a core portion 122; and a jacket portion 130 surrounding the core portion 122, the jacket portion 130 comprising a plurality of ceramic filaments 124 woven together, wherein the sealing article 120 is free of metallic components.

In a fourth aspect, the disclosure provides the stir chamber 80 of any of the first, or second aspects, wherein the sealing article 120 is free of metal and metallic components.

In a fifth aspect, the disclosure provides the stir chamber 80 of any of the first or second aspects, further comprising a vacuum system 89 for evacuating gas from the stir chamber 80.

In a sixth aspect, the disclosure provides the stir chamber 80 of any of the first or second aspect, further comprising a compressor system 87 for pressurizing gas in the stir chamber 80.

In a seventh aspect, the disclosure provides the stir chamber 80 of any of the first, second, or fourth through sixth aspects, further comprising at least one tension member 99 that couples the removable cover panel 98 to the support frame 97 and adjusts a position of the seal interface portion 142 relative to the gland 110 when the seal interface portion 142 of the removable cover panel 98 is positioned inside the gland 110 of the support frame 97.

In an eighth aspect, the disclosure provides the stir chamber 80 of any of the first, second, or fourth through seventh aspects, wherein the seal interface portion 142 comprises a contoured portion 146 that contacts the sealing article 120 when the seal interface portion 142 of the removable cover panel 98 is positioned inside the gland 110 of the support frame 97.

In a ninth aspect, the disclosure provides the stir chamber 80 of any of the eighth aspect, wherein the contoured portion 146 of the seal interface portion 142 has a surface area greater than a dimensional area of the seal land 140 evaluated in the thickness 144 of the seal interface portion 142.

In a tenth aspect, the disclosure provides the stir chamber 80 of any of the eighth aspect, wherein the contoured portion 146 comprises a round.

In an eleventh aspect, the disclosure provides the stir chamber 80 of any of the eighth aspect, wherein the contoured portion 146 comprises a chamfer.

In a twelfth aspect, the disclosure provides the stir chamber 80 of any of the first, second, or fourth through eleventh aspect, wherein the sealing article 120 further contacts at least one of the sidewalls 112 of the gland 110.

In a thirteenth aspect, the disclosure provides the stir chamber 80 of any of the twelfth aspect, wherein the sealing article 120 further contacts both the sidewalls 112 of the gland 110.

In a fourteenth aspect, the disclosure provides the stir chamber of any of the first, second, or fourth through thirteenth aspect, wherein the sealing article 120 comprises a concave portion 148 at positions where the seal land 140 contacts the sealing article 120.

In a fifteenth aspect, the disclosure provides the sealing article 120 of any of any of the first through fourteenth aspects, wherein the ceramic filaments 124 of the jacket portion 130 are woven together in an overlying relation around the core portion 122.

In a sixteenth aspect, the disclosure provides the sealing article 120 of any of the first through fifteenth aspects, wherein the ceramic filaments 124 of the core portion 122 comprise aluminosilicate filaments.

In a seventeenth aspect, the disclosure provides the sealing article 120 of any of the first through sixteenth aspects, wherein the ceramic filaments 124 of the jacket portion 130 comprise aluminum oxide filaments.

In an eighteenth aspect, the disclosure provides the sealing article 120 of any of the first through seventeenth aspects, wherein the ceramic filaments 124 of the jacket portion 130 further comprise silicon dioxide filaments.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:
1. A stir chamber for stirring molten glass comprising:
a support frame;
a removable cover panel selectively coupled to the support frame;
a gland coupled to one of the support frame or the removable cover panel, the gland having a back wall and two sidewalls extending from the back wall by a groove depth, wherein the two sidewalls are spaced apart from one another a groove width;
a seal land coupled to the other one of the support frame or the removable cover panel and positioned proximate to the gland, the seal land comprising a seal interface portion having a thickness less than the groove width of the gland; and
a sealing article comprising a plurality of ceramic filaments bundled together to form a core portion and a jacket portion comprising a plurality of ceramic filaments woven together, wherein the jacket portion surrounds the core portion,
wherein the seal interface portion is positioned inside the gland such that the sealing article is compressed and contacts the back wall of the gland, and the seal interface portion is positioned a spacing distance away from the back wall, wherein the spacing distance is less than the groove depth.

2. The stir chamber of claim 1, wherein the sealing article is free of metal and metallic components.

3. The stir chamber of claim 1, further comprising a vacuum system for evacuating gas from the stir chamber.

4. The stir chamber of claim 1, further comprising a compressor system for pressurizing gas in the stir chamber.

5. The stir chamber of claim 1, further comprising at least one tension member that couples the removable cover panel to the support frame and adjusts a position of the seal interface portion relative to the gland when the seal interface portion is positioned inside the gland.

6. The stir chamber of claim 5, wherein the at least one tension member comprises a drawbolt coupled to one of the support frame or the removable cover panel, wherein the drawbolt is adjustable to position the seal interface portion of the removable cover panel relative to the gland of the support frame.

7. The stir chamber of claim 1, wherein the seal interface portion comprises a contoured portion that contacts the sealing article when the seal interface portion is positioned inside the gland.

8. The stir chamber of claim 7, wherein the contoured portion has a surface area greater than a dimensional area of the seal land evaluated in the thickness of the seal interface portion.

9. The stir chamber of claim 7, wherein the contoured portion comprises a round.

10. The stir chamber of claim 7, wherein the contoured portion comprises a chamfer.

11. The stir chamber of claim 1, wherein the sealing article further contacts at least one of the sidewalls of the gland.

12. The stir chamber of claim 11, wherein the sealing article further contacts both the sidewalls of the gland.

13. The stir chamber of claim 1, wherein the sealing article comprises a concave portion at positions where the seal land contacts the sealing article.

14. The stir chamber of claim 1, wherein the sealing article comprises:
a plurality of ceramic filaments bundled together to form a core portion; and
a jacket portion surrounding the core portion to provide resiliency to the core portion, the jacket portion comprising a plurality of ceramic filaments woven together, wherein the sealing article is free of metal and metallic components.

15. A stir chamber for stirring molten glass comprising:
at least one wall and a cover positioned proximate to the at least one wall, the at least one wall and the cover comprising refractory materials;
a shell portion at least partially surrounding the at least one wall;
a support frame coupled to the shell portion;
a first removable cover panel and a second removable cover panel coupled to the support frame;
a plurality of glands coupled to the support frame, the glands having a back wall and two sidewalls extending from the back wall by a groove depth, wherein the two sidewalls are spaced apart from one another a groove width;
a plurality of seal lands coupled to at least one of the first or second removable cover panels and positioned proximate to a gland, the seal lands each having a seal interface portion with a thickness less than the groove width of the gland; and a sealing article comprising a plurality of ceramic filaments bundled together to form a core portion and a jacket portion comprising a plurality of ceramic filaments woven together, wherein the jacket portion surrounds the core portion;

wherein the seal interface portions are positioned at least partially inside the gland such that the sealing article is compressed and contacts the back wall of the gland, and the seal interface portion is positioned a spacing distance away from the back wall, the spacing distance being less than the groove depth.

16. The stir chamber of claim 15, further comprising a plurality of tension members that couple the removable cover panels to the support frame and adjust a position of the seal interface portions relative to the gland.

17. The stir chamber of claim 15, wherein the sealing article comprises:
   a plurality of ceramic filaments bundled together to form a core portion; and
   a jacket portion surrounding the core portion to provide resiliency to the core portion, the jacket portion comprising a plurality of ceramic filaments woven together, wherein the sealing article is free of metal and metallic components.

18. A stir chamber for stirring molten glass comprising:
   at least one wall and a cover positioned proximate to the at least one wall, the at least one wall and the cover comprising refractory materials;
   a shell portion at least partially surrounding the at least one wall;
   a support frame coupled to the shell portion;
   a first removable cover panel and a second removable cover panel coupled to the support frame;
   a plurality of glands coupled to at least one of the first or second removable cover panels, the glands having a back wall and two sidewalls extending from the back wall by a groove depth, wherein the two sidewalls are spaced apart from one another a groove width;
   a plurality of seal lands coupled to the support frame and positioned proximate to a gland, the seal lands each having a seal interface portion with a thickness less than the groove width of the gland; and
   a sealing article comprising a plurality of ceramic filaments bundled together to form a core portion and a jacket portion comprising a plurality of ceramic filaments woven together, wherein the jacket portion surrounds the core portion;
   wherein the seal interface portions are positioned at least partially inside the gland such that the sealing article is compressed and contacts the back wall of the gland, and the seal interface portion is positioned a spacing distance away from the back wall, the spacing distance being less than the groove depth.

19. The stir chamber of claim 18, further comprising a plurality of tension members that couple the removable cover panels to the support frame and adjust a position of the seal interface portions relative to the gland.

20. The stir chamber of claim 18, wherein the sealing article comprises:
   a plurality of ceramic filaments bundled together to form a core portion; and
   a jacket portion surrounding the core portion to provide resiliency to the core portion, the jacket portion comprising a plurality of ceramic filaments woven together, wherein the sealing article is free of metal and metallic components.

* * * * *